US010905098B2

(12) United States Patent
Markham (10) Patent No.: US 10,905,098 B2
(45) Date of Patent: Feb. 2, 2021

(54) ANIMAL FEEDER, COMBINATION FEEDER AND TOY, AND METHOD OF ENTERTAINING AN ANIMAL

(71) Applicant: Bounce, Inc., Golden, CO (US)

(72) Inventor: Joseph P. Markham, Arvada, CO (US)

(73) Assignee: BOUNCE, INC., Golden, CO (US)

( * ) Notice: Subject to any disclaimer, the term of this patent is extended or adjusted under 35 U.S.C. 154(b) by 139 days.

(21) Appl. No.: 16/213,223

(22) Filed: Dec. 7, 2018

(65) Prior Publication Data

US 2020/0178498 A1 Jun. 11, 2020

(51) Int. Cl.
*A01K 5/00* (2006.01)
*A01K 5/01* (2006.01)
*A01K 15/02* (2006.01)

(52) U.S. Cl.
CPC .......... *A01K 5/0135* (2013.01); *A01K 15/026* (2013.01)

(58) Field of Classification Search
CPC ........... A01K 5/00; A01K 5/01; A01K 5/0135
USPC ............ 119/51.01, 51.03, 51.13, 61.5, 61.54
See application file for complete search history.

(56) References Cited

U.S. PATENT DOCUMENTS

| | | | |
|---|---|---|---|
| 5,813,366 A * | 9/1998 | Mauldin, Jr. ........ | A01K 15/025 119/707 |
| 6,148,771 A * | 11/2000 | Costello ............... | A01K 15/026 119/709 |
| 9,848,585 B1 | 12/2017 | Perozo et al. | |
| 2004/0253908 A1 | 12/2004 | Thiry | |
| 2005/0120972 A1 * | 6/2005 | Aboujaoude ........ | A01K 15/025 119/707 |
| 2011/0290197 A1 * | 12/2011 | Koo ....................... | A23K 10/30 119/710 |
| 2012/0090554 A1 | 4/2012 | Nunn et al. | |
| 2012/0240866 A1 * | 9/2012 | Taylor .................. | A01K 15/026 119/710 |
| 2012/0279459 A1 | 11/2012 | Angle et al. | |

(Continued)

OTHER PUBLICATIONS

KONG. "KONG—Classic Dog Toy". Sep. 15, 2012. [online]. [Retrieved on Jan. 21, 2020). Retrieved from the internet: URL: https:/lwww.amazon.com/KONG-Classic-Durable-Natural-Rubber/dp/B0002AROI8/>, 10 pages.

(Continued)

*Primary Examiner* — Richard T Price, Jr.
(74) *Attorney, Agent, or Firm* — Berg Hill Greenleaf Ruscitti LLP.

(57) ABSTRACT

The invention includes a feeder device that may be used to entertain or feed an animal. The feeder device has a body with an outer peripheral edge and a central opening. A plurality of depressions or grooves and a plurality of through holes are incorporated on the body. Preferably the feeder device is made of a flexible and elastomeric material. The feeder device may be secured to a base element that extends through the central opening to form a feeder device combination. The size and shape of the central opening is adjustable because of the elastomeric material. A desired pattern and spacing may be adopted for the grooves and through holes. According to a method of the invention, a user selects an object to which the feeder device is to be attached. The feeder device is placed over the object and the body of the device stretches to accommodate the central opening to frictionally engage the object. A user loads the device with a desired treats or feed.

18 Claims, 8 Drawing Sheets

(56) References Cited

U.S. PATENT DOCUMENTS

| | | | |
|---|---|---|---|
| 2013/0008389 A1* | 1/2013 | Teconchuk | A01K 15/026 119/710 |
| 2013/0118417 A1* | 5/2013 | Teconchuk | F16B 5/0028 119/710 |
| 2013/0247836 A1* | 9/2013 | Axelrod | A01K 15/026 119/709 |
| 2014/0209038 A1* | 7/2014 | Simon | A01K 15/026 119/709 |
| 2014/0216358 A1* | 8/2014 | Hansen | A01K 15/025 119/707 |
| 2014/0251231 A1* | 9/2014 | Hansen | A01K 15/025 119/710 |
| 2014/0299070 A1* | 10/2014 | Harrington | A01K 15/025 119/707 |
| 2014/0318472 A1* | 10/2014 | Day | A01K 15/025 119/707 |
| 2015/0114309 A1* | 4/2015 | Davison, III | A01K 15/026 119/709 |
| 2015/0296746 A1* | 10/2015 | Ottosson | A01K 15/025 119/707 |
| 2015/0334993 A1* | 11/2015 | Roetheli | A23K 40/20 119/709 |
| 2015/0373950 A1* | 12/2015 | Spring | A23K 20/28 119/710 |
| 2016/0106068 A1* | 4/2016 | Axelrod | A01K 15/026 119/710 |
| 2016/0354707 A1 | 12/2016 | Polk | |
| 2018/0000048 A1 | 1/2018 | Stone et al. | |

OTHER PUBLICATIONS

International Search Report and Written Opinion dated Feb. 25, 2020 in International Application No. PCT/US2019/065205, 15 pages.

* cited by examiner

ANIMAL FEEDER, COMBINATION FEEDER AND TOY, AND METHOD OF ENTERTAINING AN ANIMAL

FIELD OF THE INVENTION

The invention relates to pet toys and feeders for pets, and more particularly, to an animal feeder device and a combination animal toy and feeder device that can be selectively mounted in a manner that enables the feeder device to be used in many settings to entertain an animal. The invention also relates to a method of entertaining an animal wherein the device is selectively mounted at locations where normally it is difficult to provide entertainment.

BACKGROUND OF THE INVENTION

The commercialization of pet toys has significantly increased over recent years. Large retail outlets provide abundant floor space for displaying a wide range of pet products. Pet toys can be found in many shapes and sizes, as well as made from different materials.

One general category of pet toys is chew toys made of a flexible or elastomeric material. If these toys are made from quality materials, they may be able to withstand the biting action of an animal to keep the animal occupied for substantial periods. It is also known to place treats in these toys to further increase interaction with the animal resulting in longer periods of the animal remaining occupied.

Another general category of pet toys is those that generally are referred to as "plush" toys. Typically, these toys have an outer shell made from a relatively soft and flexible material such as fabric. A plush toy is typically stuffed with a fibrous material such as woven polyester. The stuffing provides the plush toy with a desired thickness or that enables the animal to hold the toy. Plush toys may be prone to relatively easy destruction by vigorous chewing action of the animal.

Both chew toys and plush toys may further include noisemaking devices to further encourage the animal to interact with the toys. Noisemaking devices may include "squeakers" that produce sound when air passes through the squeaker.

Because the vast majority of pets are either dogs or cats, fewer options are available for enriching the environment of an animal such as a horse. There are simply much greater numbers of pet toys commercially available for dogs and cats as compared to horses. While it is known to provide certain larger sized dog chew toys to horses, there is still a significant shortcoming regarding the availability of toys and feeders for horses.

Not all animals have the same cognitive abilities, nor do all animals respond to humans in the same way. It is also understood that not all animals are attracted to the same type of toys or enrichment devices. For example, it is known that cats may prefer plush toys as compared to dogs that may prefer chew toys. With respect to domesticated farm animals, these animals certainly have different needs for stimulus and interaction as compared to dogs and cats.

One particular problem associated with horses is that these animals may have to spend a significant length of time in confined spaces such as a stall or transport trailer. Horses generally prefer wide-open spaces where they may roam for feeding and may otherwise continue with physical movement throughout the day. It is known that like other animals, horses can develop levels of anxiety that may endanger the overall health of the animals, as well as making them more potentially dangerous to their handlers/owners. Because of the size and strength of a horse, these animals have the potential for injuring their handlers/owners as well as the potential for injuring other animals in proximity.

Considering the general shortcoming of available solutions for entertaining large animals such as horses and to reduce anxiety these animals may suffer, there is a need for an animal enrichment device that can be easily deployed for access by an animal such as a horse that may be placed in a confined location. There is also a need for a device that can be used as a feeder to further enhance interaction of the animal with a device such as an animal toy.

SUMMARY OF THE INVENTION

According to a first preferred embodiment the invention includes a feeder device that may be selectively mounted to a number of objects such as a fence post or pole in proximity to animals.

According to another preferred embodiment of the invention, it comprises a combination animal toy and feeder device that can be selectively mounted for use in multiple settings to entertain an animal and to otherwise enrich an animal's environment.

According to yet another preferred embodiment, the invention includes a method of entertaining an animal through the feeder device that is selectively mounted at locations where it is normally difficult to provide entertainment or enrichment by a feeder or toy-feeder combination.

According to one specific intended use of the embodiments, the devices and method may be especially adapted for domesticated animals such as horses. The feeder device is provided of an adequate size that is capable of holding food or treats for a horse. The feeder device may be used in combination with a toy or selectively mounted to a stationary object such as a fence post or pole.

According to the first preferred embodiment of the feeder device, the structure of the device includes a flexible and elastomeric body with a central opening that enables the feeder device to be frictionally secured to an object where animals are present. The body is defined as having an outer peripheral edge, the central opening defined by an inner peripheral edge, and a plurality of features formed on the body that are capable of frictionally holding feed or treats for the animal. One feature includes one or more depressions or grooves. Another feature includes one or more through holes. The grooves and holes may be provided in a desired pattern and spaced from one another throughout the body of the device. The number and size of grooves and holes may be provided to most optimally present opportunities for securing feed and treats to the device for the intended animal. The elastomeric nature of the feeder device enables feed and treats to be frictionally held by the device.

According to another embodiment, the feeder device may be combined with a product such as an animal toy so to provide entertainment and enrichment for an animal not only for treats loaded in the feeder device, but also for the structure of the toy itself. In one example, the feeder device may be secured to a rubber chew toy such as a particularly large KONG® Classic pet toy. According to this example, the feeder is placed over the animal toy and is frictionally held in place around the outer surface of a selected portion of the pet toy. The animal toy may also be referred to as a base object or base element.

Alternatively, the feeding device may be frictionally secured to any number of stationary objects that may be placed near the location of the animals. For example, the feeding device may be secured to a fence post, a pole, or a tree branch located in proximity to the animals.

According to the method of the invention, the feeding device is frictionally secured to the object of interest. The feeding device is then loaded with feed or treats for the animal. The through holes are capable of frictionally holding feed/treats placed there through. The grooves or depressions are also capable of frictionally engaging feed/treats wedged therein. A user of the device may select desired types of treats and feed to use with the feeder device. For example, the feeding device is capable of holding straw or fibrous materials, pieces of cut fruit or vegetables, and nugget shaped treats that could be manufactured especially for horses.

According to another aspect of the invention, the combination device can be presented to an animal by suspending the combination device at a desired height. One example includes suspending the combination device within an animal stall where a horse may have to spend a significant amount of time. The combination device is suspended at a convenient height so when the animal is standing in a normal position, the animal may conveniently access the combination device. Suspending the combination device in this manner allows the device to move when contacted by the animal which may contribute to prolonged interaction of the animal with the combination device.

According to another aspect of the invention, the combination device can be secured to a spring mounted pole. As the animal contacts the combination device, the spring action allows the combination device to be selectively displaced by the animal which may encourage further interaction with the device.

The feeder device can be provided in a multitude of shapes and sizes. According to one preferred embodiment, the feeder device is ring shaped with a circular outer peripheral edge and a circular shaped inner peripheral edge defining a central opening. A plurality of grooves and through openings is provided on the body of the device in a desired pattern and spacing. According to one particular configuration, the device could include a plurality of arcuate shaped grooves located near the outer peripheral edge of the device, a plurality of arcuate shaped through openings located near the inner peripheral edge of the device, and a plurality of additional grooves and through openings spaced throughout the remaining open areas on the body of the device.

As further described in the detailed description, specific configurations for the shape of the feeder device could include: a ring shaped device with a greater depth or thickness dimension which also allows grooves or through openings to be placed on the outer peripheral edge of the body of the device, a flower shaped device with a plurality of petals or legs, each having a plurality of grooves or through openings; and an irregular shaped feeder device with a plurality of randomly spaced and shaped legs or projections that extends radially away from the central opening.

According to yet another preferred embodiment of the invention, it includes an animal entertainment and enrichment suspension apparatus comprising at least one feeder device secured to a base object or element with the combination device suspended from a frame. The base element may include an animal toy. The frame is configured to suspend the combination device at a desired height and angularity. The frame is secured to a pole or other vertically extending element. Optionally, the pole may be spring mounted. The apparatus may include a plurality of combination devices along with a plurality of separately suspended treats in which the frame is capable of spacing the presentation of each of the treats and combination devices. In this regard, the frame more specifically could be shaped as a circular frame extending perpendicularly from the pole and the combination devices and treats therefore being suspended in a carousel arrangement.

Considering the above features of the invention, in one aspect, it may be considered a device especially adapted for feeding and entertaining an animal, comprising: a body made of a flexible and elastomeric material, said body having an outer peripheral edge and an inner peripheral edge defining a central opening; at least one through hole formed through the device; and at least one groove formed through a selected surface of the device.

According to another aspect of the invention, it may be considered a combination of a feeder device and a base element such as a toy, comprising: a body made of a flexible and elastomeric material, said body having an outer peripheral edge and an inner peripheral edge defining a central opening; at least one through hole formed through the device; at least one groove formed through a selected surface of the device; and a base element extending through said central opening wherein the central opening is stretched to receive the base element.

According to another aspect of the invention, it may be considered a method of entertaining or feeding an animal, comprising: providing a feeder device having a body made of a flexible and elastomeric material, said body having an outer peripheral edge and an inner peripheral edge defining a central opening; at least one through hole formed through the device; and at least one groove formed through a selected surface of the device; loading the device with at least one treat by frictionally holding the treat with said at least one groove or through hole; and presenting the device with the loaded treat to the animal.

Additional features and aspects of the invention will become apparent from a review the following detailed description taken in conjunction with a review of the drawings.

DETAILED DESCRIPTION

Figure 1:
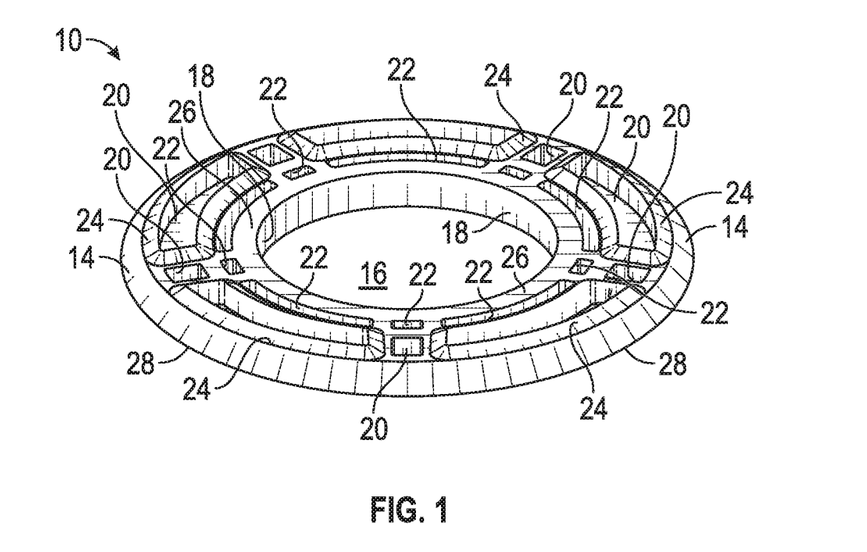
FIG. 1 is a perspective view of the feeder device of the invention in one preferred embodiment.
Figure 2:
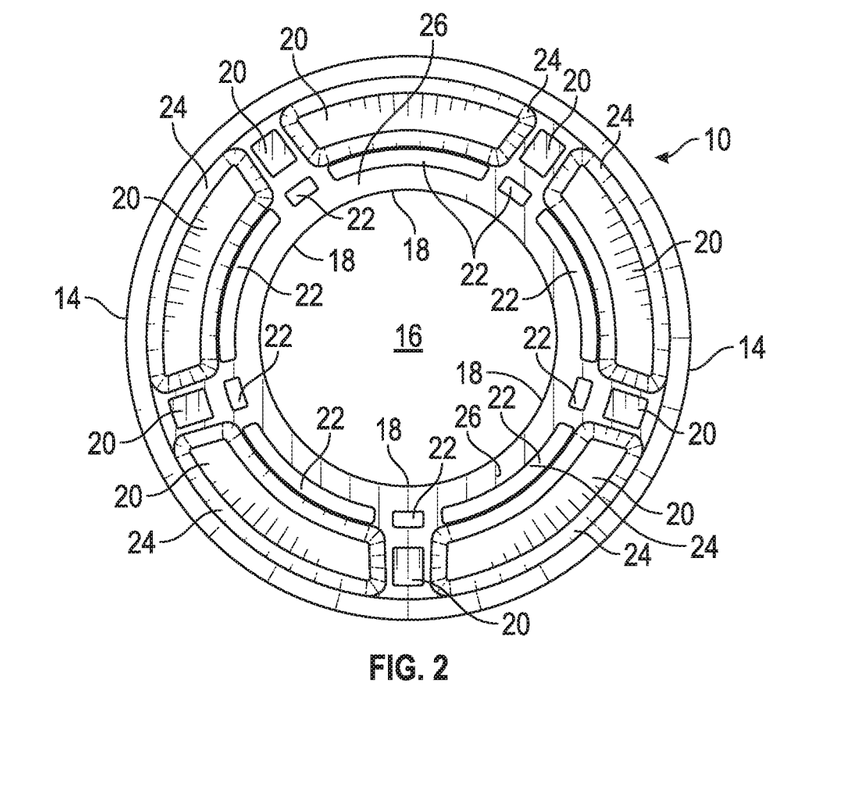
FIG. 2 is a top plan view of the feeder device of FIG. 1.

FIGS. 1 and 2 illustrate a first preferred embodiment of the invention shown as a feeder device 10. The feeder device is preferably made of a flexible and elastomeric material that enables the device 10 to be frictionally engaged and held by a base element. As discussed below with respect to the various other embodiments of the invention, the base element may comprise an animal toy, fence post, or any other object to which the user wishes to attach the device 10.

The structure of the feeder device 10 is characterized by a ring shaped body with an outer peripheral edge 14 and a central opening 16 defined by an interior edge 18. The body of the device further includes a plurality of depressions or grooves 20 and a plurality of through holes 22 that extend through a width of the body. The overall depth of the depressions/grooves 20 can be increased with surrounding ridges 24 that extend above the upper surface 26 of the body. A width or thickness of the device is defined as the distance between the upper surface 26 and a lower surface 28.

The device 10 may incorporate a desired pattern and spacing of depressions/grooves 20, through holes 22, and ridges 24. In the preferred embodiment of FIGS. 1 and 2, one particular pattern or configuration is shown in which there are four larger circumferentially spaced depressions/grooves 20, each with corresponding ridges 24 that surround the respective peripheries of the depressions/grooves 20. Four additional smaller depressions/grooves 20 are provided that do not have corresponding ridges 24 and are located between each of the larger depressions/grooves 20. The larger grooves 20 have an arcuate shape. The smaller grooves 20 have a rectangular shape.

As further shown in FIGS. 1 and 2, the plurality of through holes 22 are also provided in a similar pattern as compared to the grooves 20. Specifically, four larger arcuate shaped and circumferentially spaced through holes 20 are provided. Four smaller rectangular shaped through holes 20 are located between each of the larger through holes 20.

It should be understood that the specific arrangement of grooves and holes can be modified to adapt the feeder for the specific type of feed or treats that are to be presented to an animal. Accordingly in some cases, it may be desired to have more or fewer grooves or more or fewer holes. Yet further, the particular shape and spacing of the grooves and holes can be modified to best provide the feeder with the type of structure which is optimal for securing feed or treats to be used.

Figure 3:
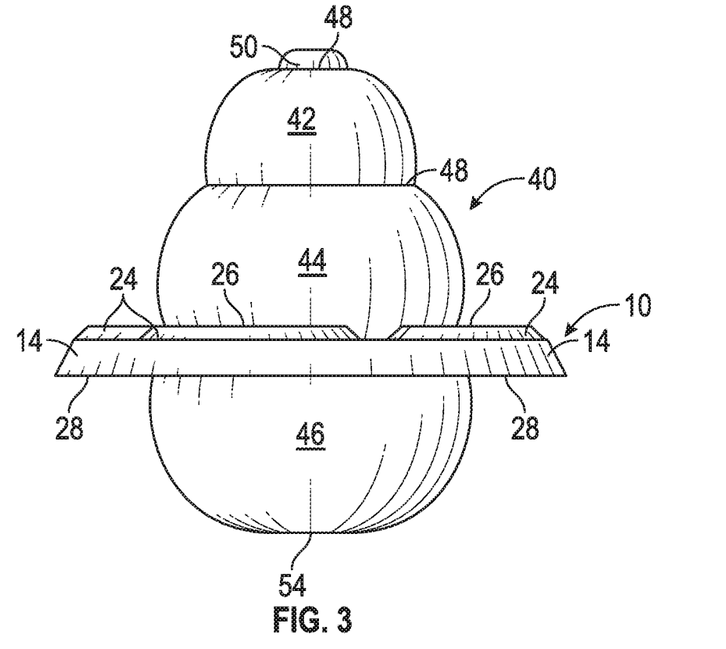
FIG. 3 is a side elevation view of the feeder device secured to a base object or element in the form of a pet toy.
Figure 4:
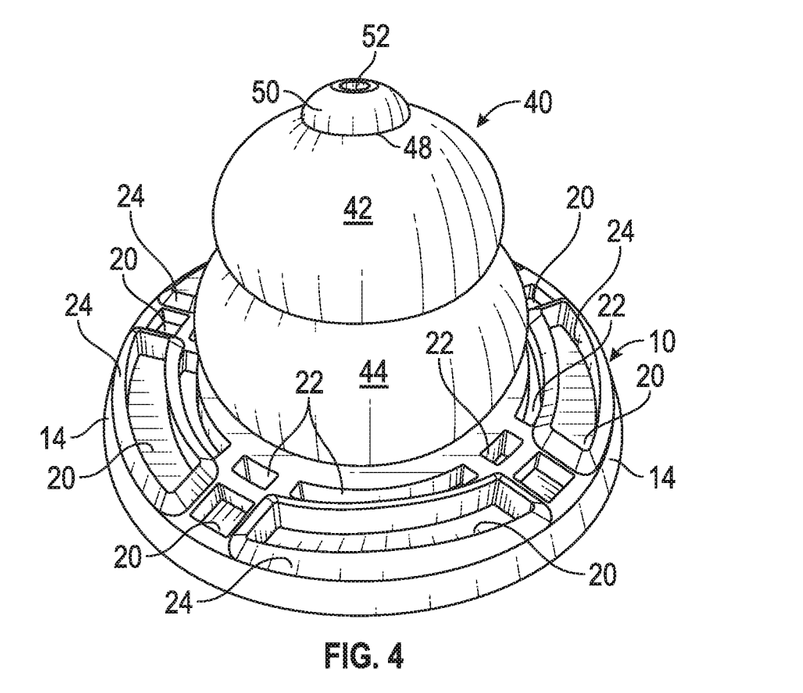
FIG. 4 is a perspective view of the feeder device secured to the base object shown in FIG. 3.

Referring to FIGS. 3 and 4, another preferred embodiment is illustrated in which the invention is considered a combination of the feeder device secured to a base element. The base element shown in FIGS. 3 and 4 is shaped like a KONG® Classic pet toy 40. This pet toy 40 can be generally described as having multiple tiers or levels including an upper tier 42, a middle tier 44, and a lower tier 46. An upper protrusion 50 may extend above the uppermost portion of the upper tier 42. Areas where the respective tiers are connected to one another may be described as transition lines or transition areas 48 as shown in the figures. The lower surface or edge 54 of the toy 40 may be substantially flat. An opening 52 extends through the interior of the toy. The toy is made from a flexible and elastomeric material. In use, the feeder device 10 is positioned over and frictionally attached to the toy 40. The particular diameter of the central opening 16 can be selected such that the feeder device 10 is secured to a desired portion or level of the toy 40. As shown in the embodiment of FIGS. 3 and 4, the feeder device 10 is secured between the middle tier 44 and lower tier 46 at or near a transition line/area 48 that delineates where the two tiers are joined. It is also contemplated that more than one feeder device can be secured to the toy 40, such as another feeder device (not shown) which is frictionally secured to the toy 40 between the upper tier 42 and the middle tier 44 at or near the corresponding transition line/area 48. For this additional feeder device, the diameter of the central opening 16 would be smaller to be capable of frictionally engaging the toy 40.

Figure 5:
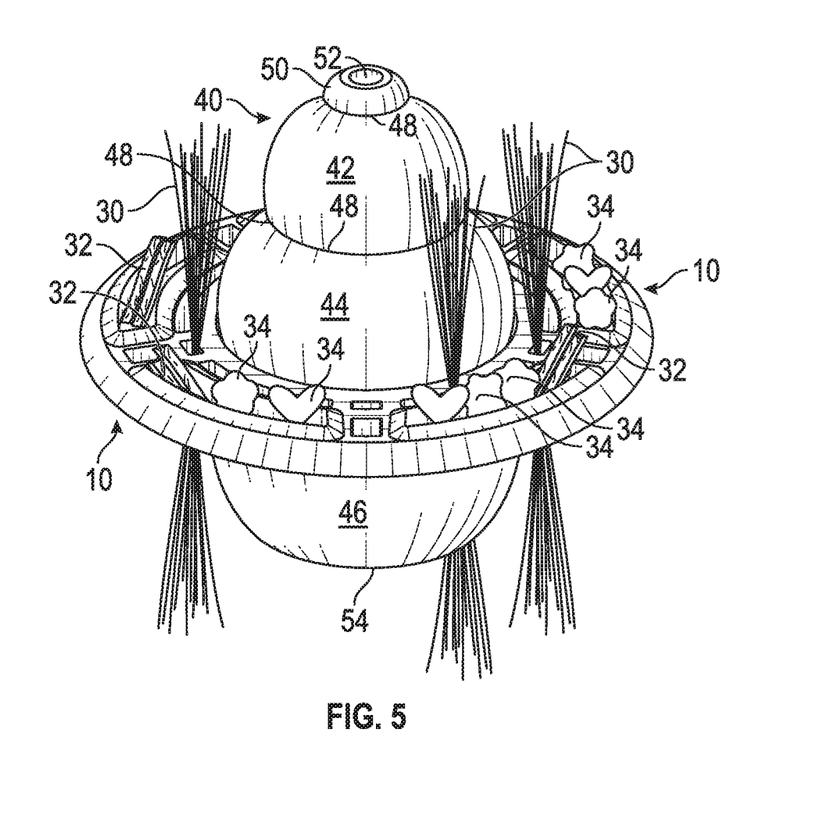
FIG. 5 is a perspective view of FIG. 4 further illustrating animal treats and feed secured to the feeder device.
Figure 6:
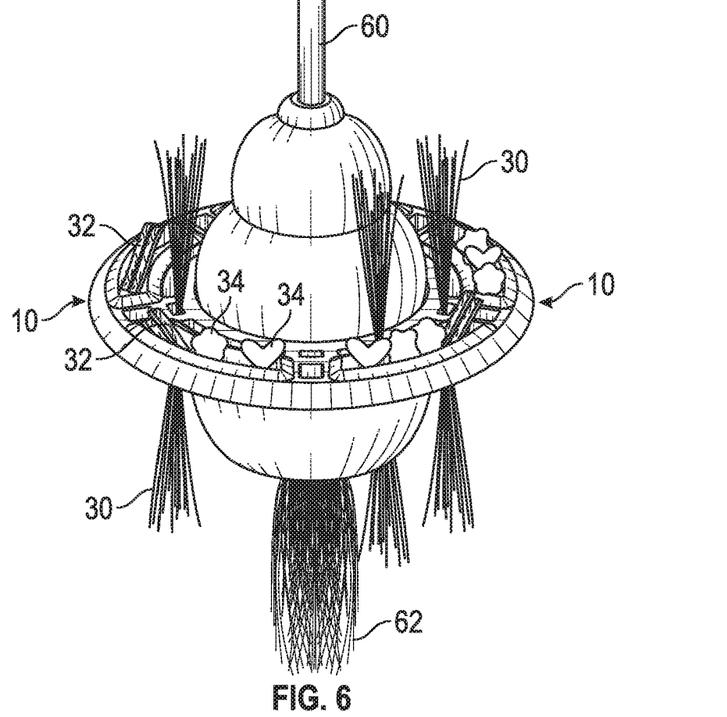
FIG. 6 is a perspective view of the combination feeder device and base object suspended by a cord.

Referring to FIGS. 5 and 6, the feeder device 10 is illustrated as being secured to the toy 40 and having a plurality of edible treats and/or animal feed frictionally secured to the feeder device. In these figures, exemplary treats or feed includes straw or other fibrous material 30, pieces of cut fruit or vegetables 32, and nugget type treats or feed 34. The straw 30 is illustrated as secured to the through openings 22, the fruit/vegetables shown as secured within the grooves 20, and the nugget type treats 34 being also secured within the grooves 20. These figures illustrate the wide variety of feed or treats that may be held by the device 10 thereby providing an owner with many options as to how and what type of treats or feet may be presented to an animal. It should be understood that while FIGS. 5 and 6 illustrate specific types of feed or treats, the invention is not limited to any combination of feed or treats, the specific types and locations where the feed/treats are shown in these figures simply being exemplary.

FIG. 6 also discloses another way in which the feeder device 10 may be presented to an animal. A piece of flexible rope or cord 60 can be used to suspend the device 10 at a convenient location for access by the animal. For horses or other domestic animals, it may be easiest to suspend the feeder 10 as opposed to securing the device 10 to a stationary object that projects from the ground. The rope/cord 60 may employ a knot (not shown) that is disposed within the open interior of the toy and therefore keeps the rope/cord secured to the toy. The free end 62 of the cord 60 is illustrated as being frayed; however, the cord may have a knotted end or any configuration that is convenient for the user of the device.

Figure 7:
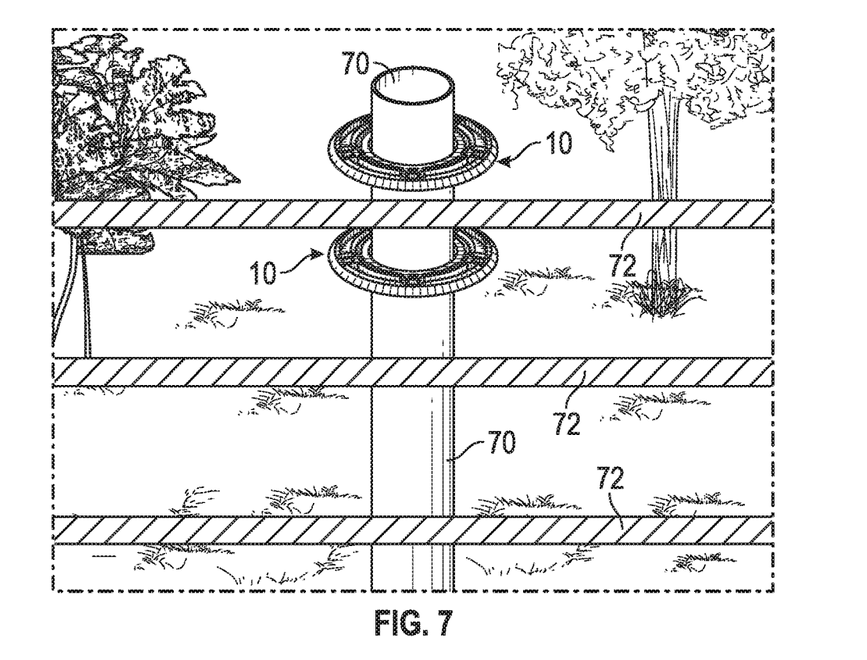
FIG. 7 is a perspective view of two feeder devices secured to a fence post.

Referring to FIG. 7, the feeder device is shown according to another use in which the device is secured to a fence post 70. Depending upon the type of fence construction, it may be possible to locate more than one device 10 on a single fence post 70. As shown, the type of fence illustrated includes a number of horizontal cross members or boards 72 with gaps between adjacent boards 72. In this particular fence construction, it is therefore possible to secure a plurality of devices 10 to the same fence post 70. Temporarily removing a board 72 allows another device 10 to be moved downward over the fence post to the desired elevation above the ground and between two adjacent boards.

Figure 8:
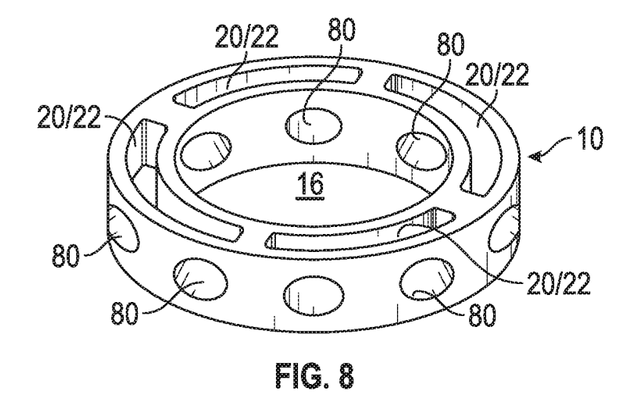
FIG. 8 is a perspective view of another preferred embodiment of the feeder device in a modified ring shape.

FIG. 8 illustrates another preferred embodiment of the device 10. In this embodiment, the device further includes a plurality of outer peripheral openings or grooves 80. The depth or thickness of the device 10 is increased to facilitate the outer peripheral openings/grooves 80.

Figure 9:
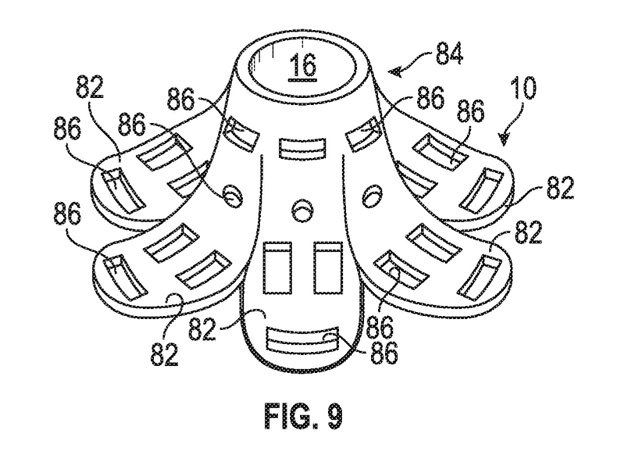
FIG. 9 is a perspective view of another preferred embodiment of the feeder device having a plurality of petals or legs.

FIG. 9 illustrates yet another preferred embodiment of the device 10. In this embodiment, the device resembles a flower with a plurality of petals 82 which form extensions away from a center or longitudinal axis of the device. The central portion 84 of the device 10 projects upward where the petals 82 converge. The central portion 84 has a generally circular shape as shown thereby facilitating the circular shaped central opening 16. A plurality of grooves or through holes 86 are dispersed throughout the body of the device.

Figure 10:
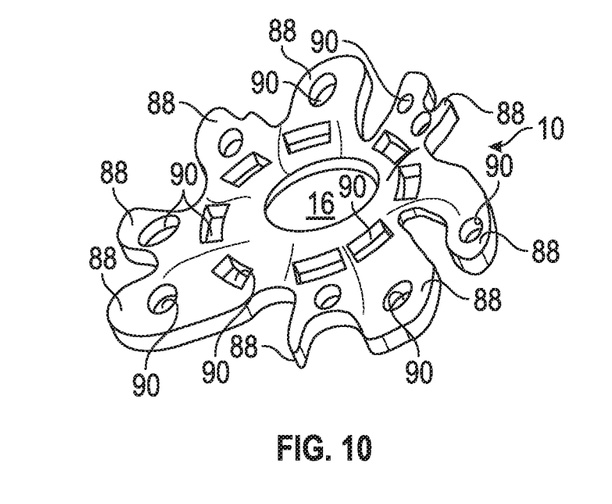
FIG. 10 is a perspective view of another preferred embodiment of the feeder device having an irregular shape with a plurality of radially extending legs or projections.

FIG. 10 illustrates yet another preferred embodiment of the device 10. In this embodiment, the device has an irregular shape with a plurality of irregular shaped and spaced legs or projections 88. As with the embodiment illustrated in FIG. 9, a plurality of through holes or grooves 90 are dispersed throughout the body of the device.

Figure 11:
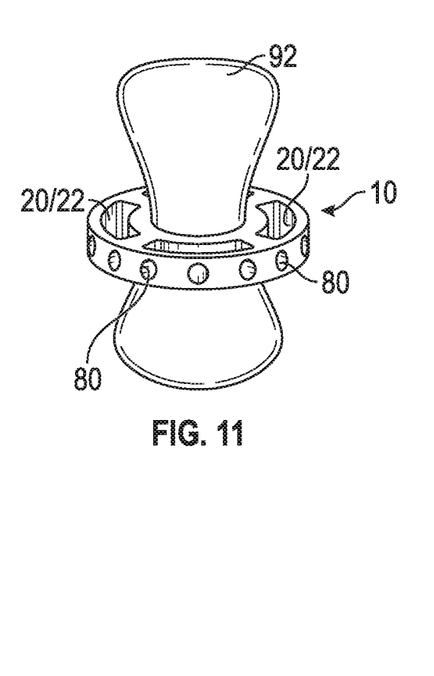
FIG. 11 is a perspective view of one of the embodiments of the feeder device secured to an elongate shaped base.
Figure 12:
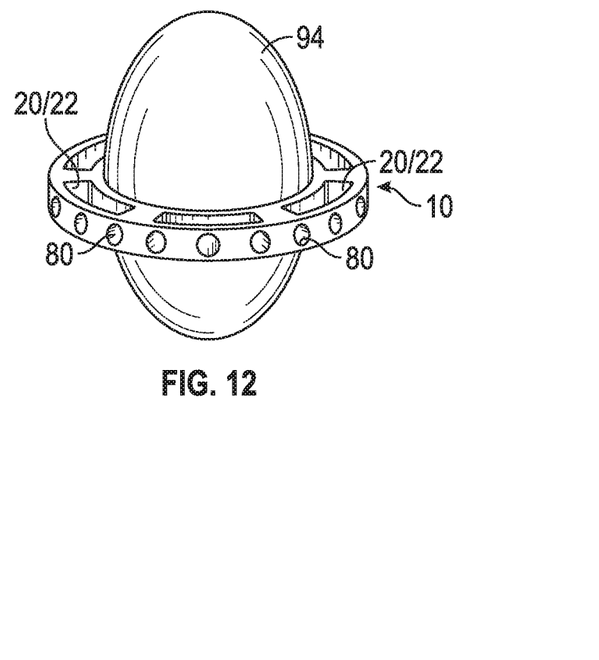
FIG. 12 is a perspective view of one of the embodiments of the feeder device secured to an elliptical or egg shaped base.
Figure 13:
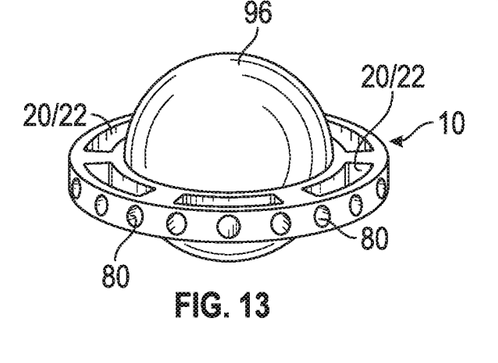
FIG. 13 is a perspective view of one of the embodiments of the feeder device secured to a spherical shaped base.
Figure 14:
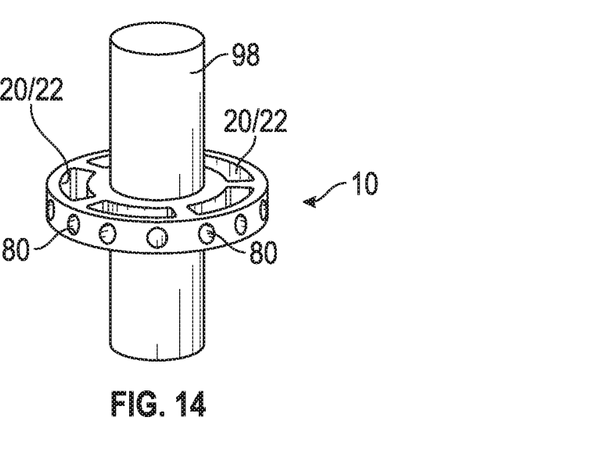
FIG. 14 is a perspective view of one of the embodiments of the feeder device secured to a cylindrical shaped base.

FIGS. 11-14 illustrate the preferred embodiment of FIG. 8 as it can be used with a number of different types of base objects or elements. In the example of FIG. 11, the device 10 is used in combination with a base element 92 that has opposite enlarged ends and a smaller central portion located between the ends. In the example of FIG. 12, the device 10 is used in combination with a base element 94 that has an egg or elliptical shape. In the example of FIG. 13, the device 10 is used in combination with a base element 96 that has a spherical shape. In the example of FIG. 14, the device 10 is used in combination with a base element 98 that has a cylindrical shape.

It should be apparent from a review of the FIGS. 11-14 that the device 10 is adaptable for use in combination with many different types of base objects or elements. Because the device 10 is preferably made from a flexible and elastomeric material, the device 10 may be stretched so that the central opening 16 can frictionally engage base elements of different sizes and shapes.

Figure 15:
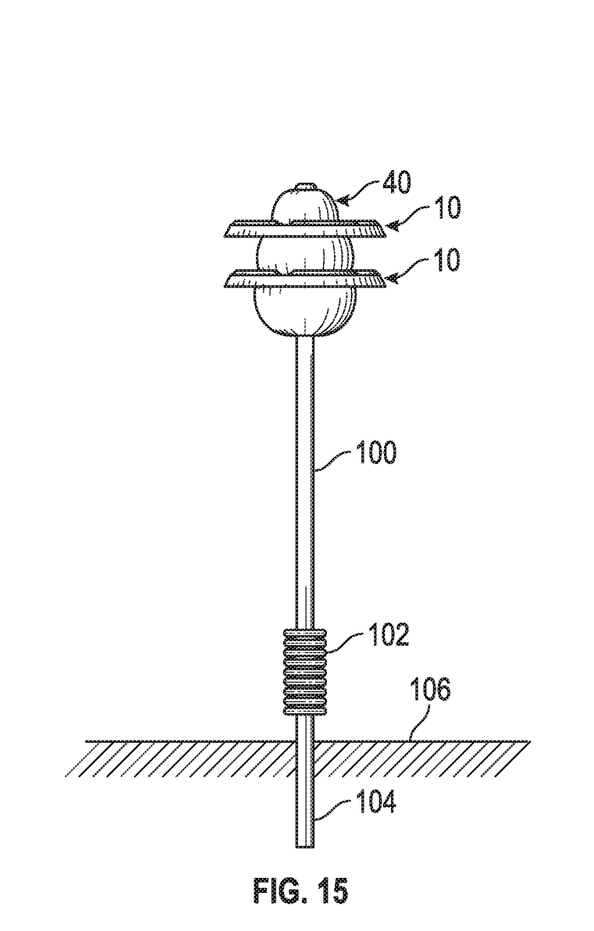
FIG. 15 is a side elevation view of two feeder devices secured to a base pet toy object and the combination device attached to a spring mounted pole.

FIG. 15 illustrates another embodiment in which a pair of devices 10 secured to the toy 40. The toy 40 is mounted over a vertical member 100 such as a post or pole. The lower end of the pole 100 incorporates a spring 102 so that contact by an animal with the device 10 or toy 40 allows the device/toy to displace in response to the force of the contact. The lower end of the pole 104 is anchored in the ground, or may otherwise be secured to the ground so that the pole remains stationary. The spring 102 more specifically allows an oscillating movement for the device and toy combination that may result in increased play or interaction by the animal.

Figure 16:
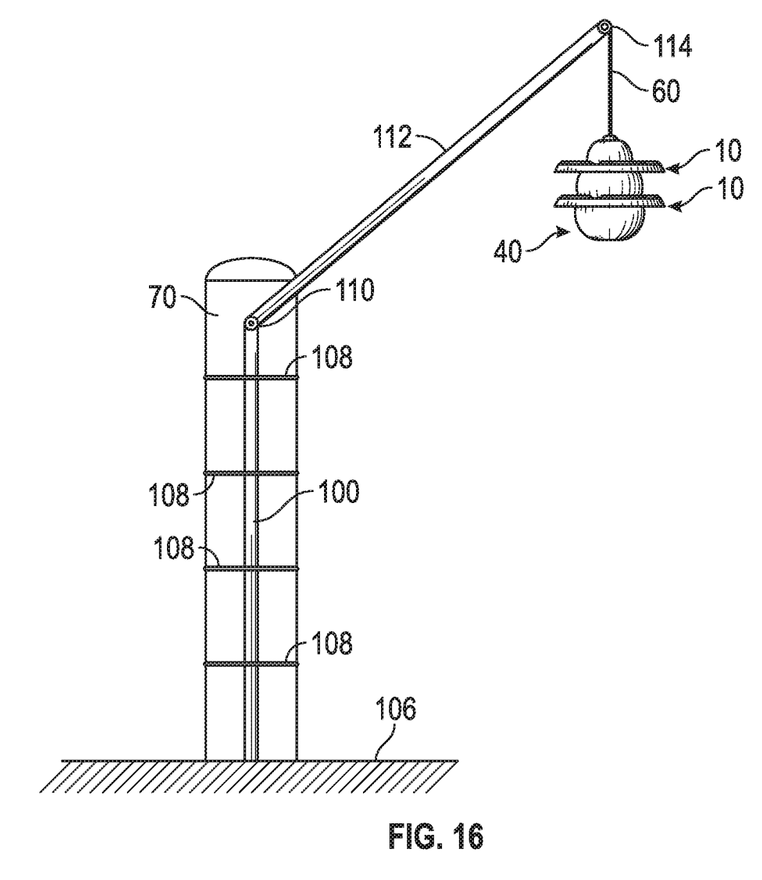
FIG. 16 is another side elevation view of the combination device suspended from a suspension apparatus.

FIG. 16 illustrates yet another embodiment in the form of a suspension apparatus in which a pair of devices 10 is secured to the toy 40 and the combination is suspended by the cord 60. An arm 112 presents the toy 40 at a desired height. The distal end of the arm 114 is secured to the cord 60. The proximal end of the arm 112 attaches to a spring member 110 that allows the arm 112 to rotate, thereby raising or lowering the height of the toy 40. A support pole 100 has an upper end that supports the spring member 110. The support pole 100 may be secured to an existing post 70 or other object near the location where animals may interact with the device and toy combination. Straps 108 may be used to attach the support pole 100 to the post 70.

Figure 17:
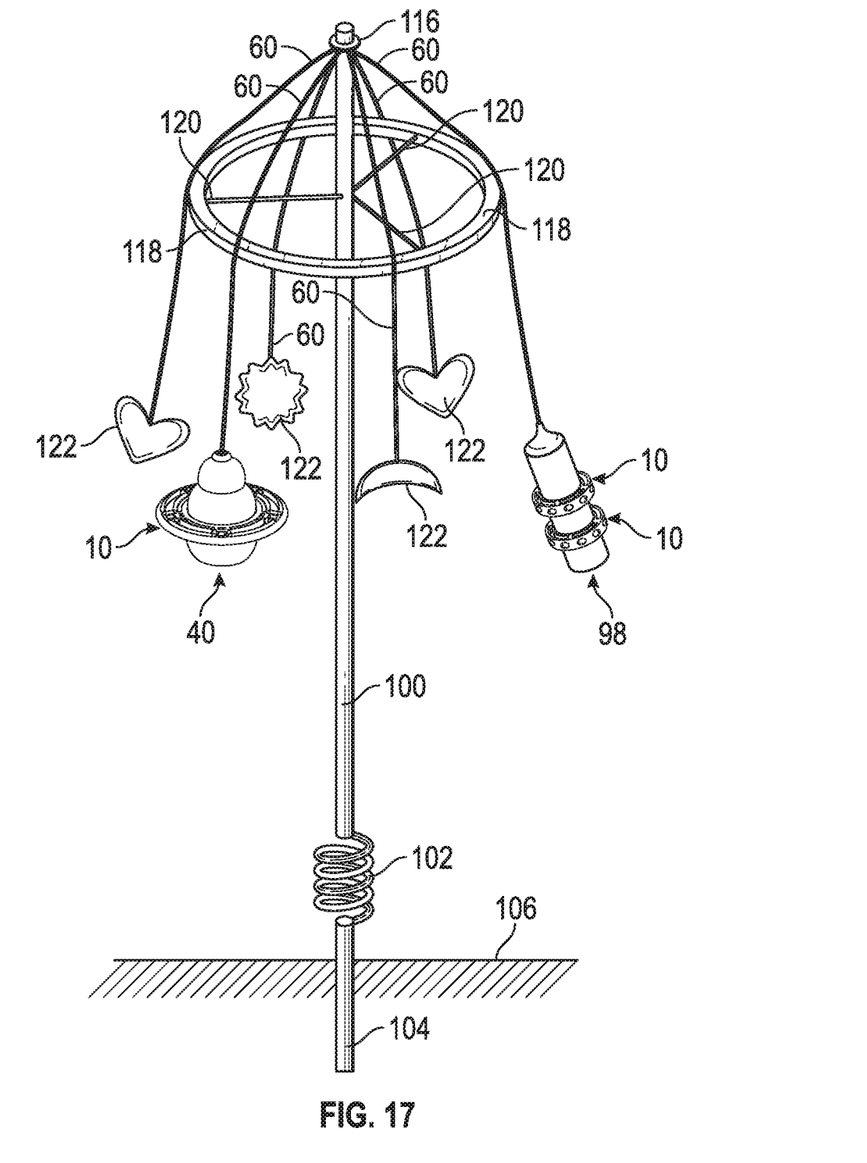
FIG. 17 is a perspective view of another embodiment in the form of another suspension apparatus comprising a plurality of combination pet toy and feeder devices and a plurality of separately suspended treats in which the suspension apparatus provides a carousel configuration for presenting feed/treats to an animal.

FIG. 17 illustrates yet another embodiment in which a carousel type suspension apparatus is used to suspend a plurality of dispensers 10 along with a plurality of treats/feed 122. The support pole 100 is provided in the same way as shown in connection with the embodiment of FIG. 15. A securing ring 116 is attached near the upper end of the pole. A plurality of flexible members such as cords 60 are attached at their respective upper ends to the securing ring 116. The lower ends of the cords 60 have selected treats and/or toys secured thereto. Specifically, FIG. 17 shows two toys 40/98 with feeder devices 10, along with a plurality of treats 122. In order to provide separation between the toys and treats, a wheel 120 is mounted to the pole 100 as by a plurality of spokes 120 as shown. According to the configuration of this embodiment, multiple opportunities are provided for one or more animals to access treats and to interact with the toys. Contact with the treats and/or toys may cause an oscillating movement of the apparatus as controlled by the specific type of spring 102 that may be employed.

The invention has been set forth herein with respect to multiple embodiments. However, it shall be understood that the invention is not specifically limited to these embodiments. The scope of the invention is to be considered commensurate with the claims appended hereto.

What is claimed is:

1. A device especially adapted for feeding and entertaining an animal, comprising:
   a body made of a flexible and elastomeric material, said body having an outer peripheral edge and an inner peripheral edge defining a central opening;
   at least one through hole formed through the device;
   at least one groove formed through a selected surface of the device; and
   wherein said body has an upper surface, a lower surface, and a thickness defined as a space between said upper and lower surfaces, said at least one through hole extends completely through said body, said at least one groove is formed through either said upper or lower surface and said at least one groove does not extend completely through said thickness.

2. The device, as claimed in claim 1, wherein:
   said body has a circular shape, and said at least one through hole or said at least one groove has an arcuate shape.

3. The device, as claimed in claim 1, wherein:
   one through hole of said at least one through hole is spaced radially inward from said at least one groove.

4. The device, as claimed in claim 1, wherein:
   one groove of said at least one groove is spaced exteriorly from said at least one through hole.

5. The device, as claimed in claim 1, wherein:
   said at least one groove includes a plurality of grooves and said at least one through hole includes a plurality of through holes wherein the plurality of grooves and plurality of through holes are spaced from one another circumferentially around said body.

6. The device, as claimed in claim 1, further including:
   at least one ridge formed on said body and communicating with a corresponding groove of said at least one groove.

7. The device, as claimed in claim 1, wherein:
   said body has an upper surface, a lower surface, and a thickness defined as a space between said upper and lower surfaces, and at least one outer peripheral opening formed on said outer peripheral edge.

8. The device, as claimed in claim 1, wherein said body is circular shaped.

9. The device, as claimed in claim 1, wherein:
said body includes a plurality of projections extending away from a central area of said body.

10. The device, as claimed in claim 1, wherein:
said body includes a plurality of irregular shaped legs extending radially away from said central opening.

11. A device especially adapted for feeding and entertaining an animal, comprising:
a body made of a flexible and elastomeric material, said body having an outer peripheral edge and an inner peripheral edge defining a central opening;
at least one through hole formed through the device;
at least one groove formed through a selected surface of the device;
a base element extending through said central opening, said base element has at least two tiers and wherein said device is secured to said base element at an area located between said tiers.

12. The device, as claimed in claim 11, wherein:
said base element has a lower tier, a middle tier, an upper tier, a lower transition area located between said lower tier and said middle tier, and an upper transition area located between said middle tier and said upper tier; and
wherein said device is secured to said base element at said lower transition area or said upper transition area.

13. A method of entertaining or feeding an animal, comprising:
providing a feeder device having a body made of a flexible and elastomeric material, said body having an outer peripheral edge and an inner peripheral edge defining a central opening; at least one through hole formed through the device; and at least one groove formed through a selected surface of the device;
loading the device with at least one treat by frictionally holding the treat with said at least one groove or through hole;
securing the device to a base element;
suspending the base element by a cord; and
presenting the device with the loaded treat to the animal.

14. The method, as claimed in claim 13, wherein:
the base element is secured to the device by placing the base element through the central opening and stretching the central opening to thereby frictionally engage and hold the device to the toy.

15. The method, as claimed in claim 14, wherein:
the base element is a pet toy made of a flexible and elastomeric material.

16. The method, as claimed in claim 13, further including:
securing the feeder device to a stationary object prior to presenting the device to the animal.

17. The method, as claimed in claim 16, wherein:
the stationary object projects from and is anchored to the ground.

18. The method, as claimed in claim 16, wherein:
the stationary object has an integral spring that enables the stationary object and feeder device to move when the animal contacts the device.

* * * * *